Nov. 16, 1926.  
T. C. HOLLIDAY  
1,607,349  
DIRIGIBLE HEADLIGHT  
Filed Dec. 15, 1924   3 Sheets-Sheet 2
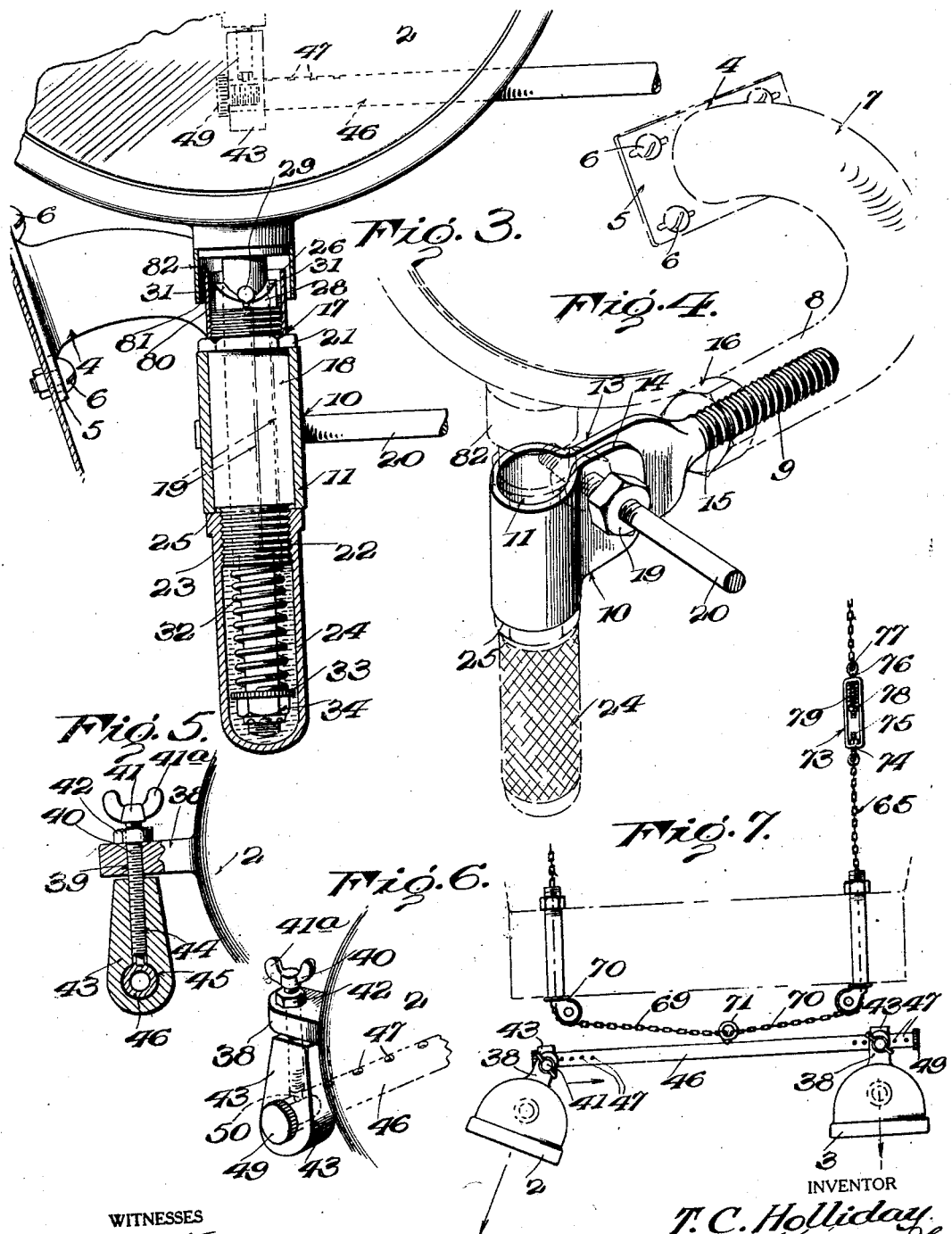
WITNESSES  
W. A. Williams  
W. F. Buckley
INVENTOR  
T. C. Holliday  
BY  
ATTORNEYS

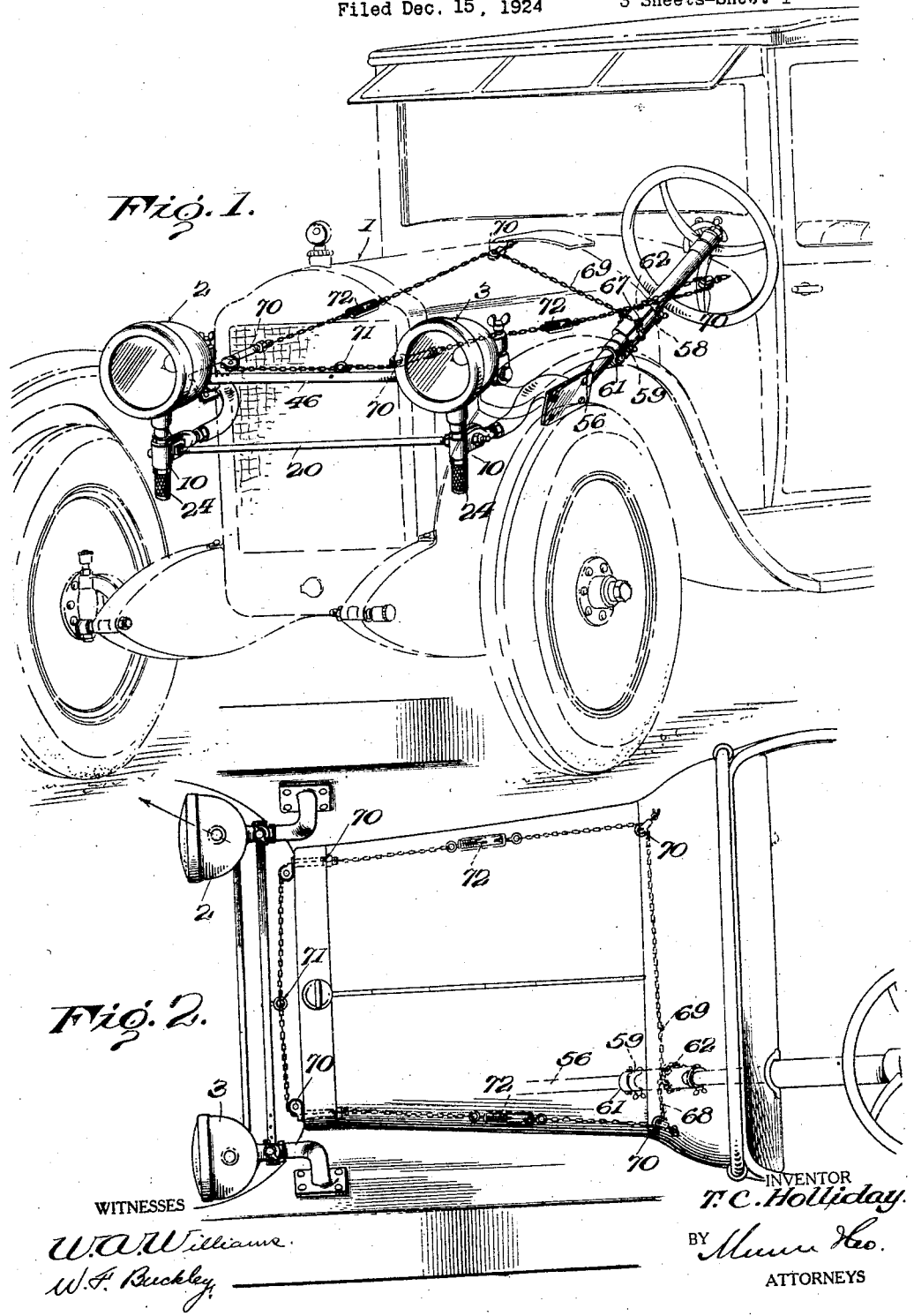

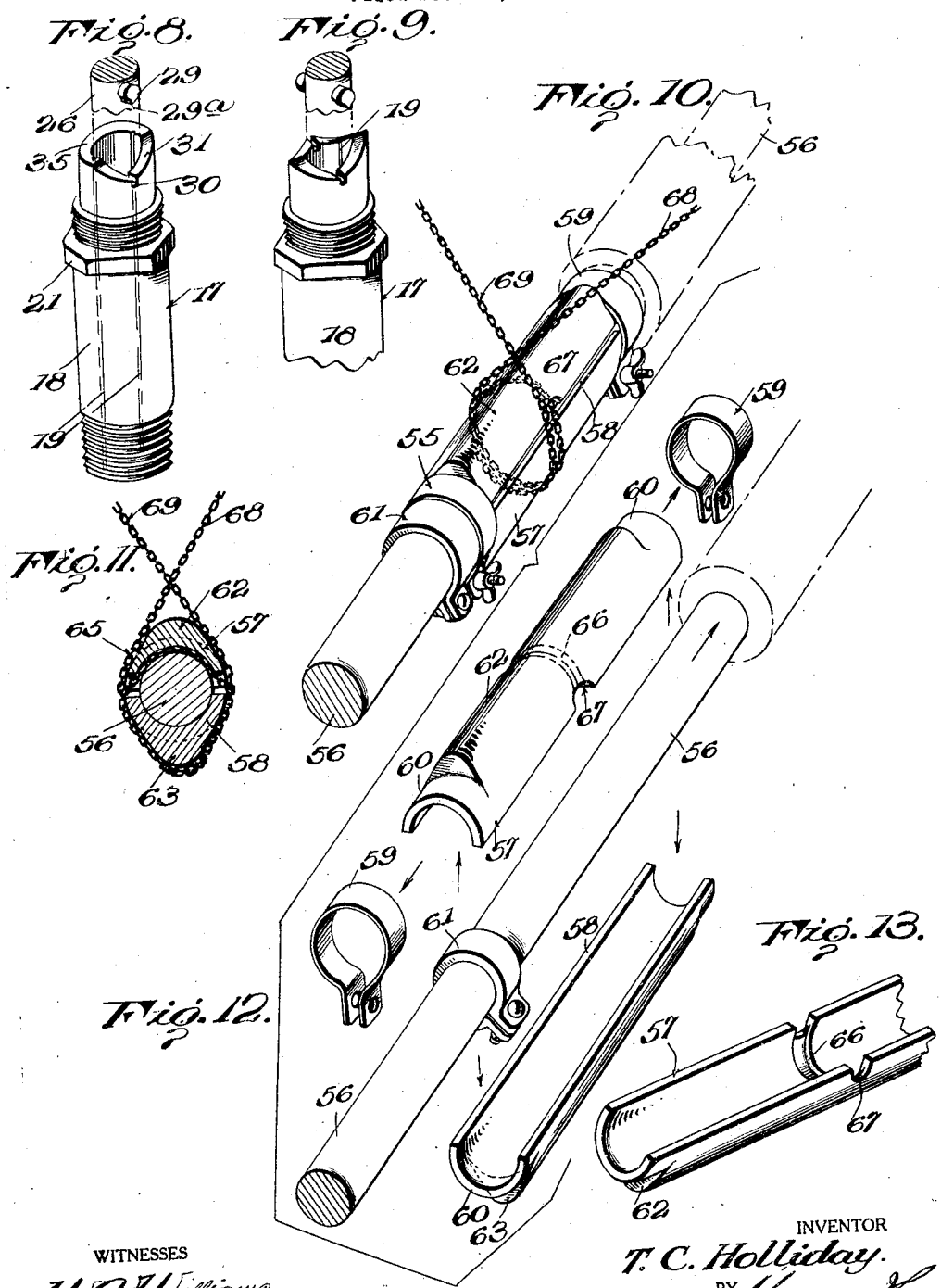

Patented Nov. 16, 1926.

1,607,349

UNITED STATES PATENT OFFICE.

THOMAS C. HOLLIDAY, OF CANTON, MISSISSIPPI, ASSIGNOR TO HOLLIDAY LIFE SAVING HEADLIGHT CO., OF JACKSON, MISSISSIPPI, A CORPORATION OF MISSISSIPPI.

DIRIGIBLE HEADLIGHT.

Application filed December 15, 1924. Serial No. 756,056.

This invention relates to an improvement in dirigible headlights for automobiles or similar motor vehicles, and the present application is a continuation in part of my allowed application, filed May 17, 1922, Serial No. 561,636.

The object of the invention is the provision of a dirigible headlight of this character wherein either or both headlights may be constrained to turn to always play upon the road even when the automobile is rounding a curve but in which, when desired, the right light is constrained to turn to play upon the road when the automobile is making a right hand turn or rounding a right curve, the left light at such time remaining stationary and facing straight ahead to illuminate a ditch, fence, or whatever else occurs at the side of the road and in which the left light is also constrained to play upon the road when the car is making a left hand turn or rounding a left curve, the right light at such time remaining stationary and facing straight ahead.

A further object is the provision of a headlight which is not affected by the slight steering movements ordinarily necessary and made while a car is travelling along a substantially straight road.

A further object is the provision of a headlight having the advantages and capacities mentioned and wherein the headlights are held fixed and stationary when the car is running straight ahead, vibration, shaking and noise being eliminated even after the parts have become worn.

Another object is the provision of a headlight which may be turned and held in any of a number of angular positions so that it is adapted for use as a trouble light.

A still further object is the provision of a headlight which is so mounted as to be susceptible of easy and ready adjustment to insure proper position of the headlight.

Still another object is the provision of novel and efficient operating means for imparting the proper movements to the headlights from the steering gear.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a perspective view showing an automobile equipped with headlights embodying the present invention, Figure 2 is a fragmentary view in plan of the arrangement shown in Figure 1, Figure 3 is a view partly in section and partly in elevation showing the mounting employed for the headlights, Figure 4 is a perspective view illustrating the supporting bracket and supporting clamp construction, Figure 5 is a fragmentary view partly in section and partly in elevation showing how the operating bar is connected with the headlights, Figure 6 is a fragmentary view in perspective of the parts shown in Figure 5, Figure 7 is a fragmentary view in plan illustrating the operation of the headlights, Figure 8 is a detail perspective view of the bearing sleeve employed in the mounting of the headlight, Figure 9 is a fragmentary view similar to Figure 8 of a modified form of the bearing sleeve, Figure 10 is a fragmentary view in perspective showing how the operating means is mounted on the steering column, Figure 11 is a view in transverse section of the arrangement shown in Figure 10, Figure 12 is a group view in perspective showing the parts illustrated in Figure 10 prior to assembly, and Figure 13 is a fragmentary perspective view showing the groove provided in one of the cam sections for clamping the operating chain.

Referring to the drawings the numeral 1 designates an automobile which may be any type of motor vehicle and which has headlights or lamps, the right headlight or lamp being designated at 2 and the left headlight or lamp being designated at 3. A bracket, designated generally at 4, is provided for each of the headlights, the brackets 4 being mounted on the fenders and having for this purpose attaching plates 5 secured by fastening means 6 to the fenders in the usual way. Curved portions 7 extend outwardly from the plates 5 and have integrally formed therewith forwardly extending bracket arms 8 provided at their outer ends with internally threaded sockets 9.

A supporting clamp, designated generally at 10, is associated with each bracket 4 and each supporting clamp 10 includes a split cylindrical clamping member 11 having apertured clamping ears 13 and 14. The clamping ear 13 has an externally threaded stud 15 integrally formed therewith, and this stud 15 is threadedly engaged with the socket 9. By turning the stud 9 into or out of the socket the headlights may be adjusted fore and aft of the vehicle and their angular adjustment about a horizontal axis may also be available. Lock nuts 16 are engaged with the studs 15 and with the outer ends of the sockets for holding the studs in any adjustment.

A bearing sleeve, designated generally at 17, is mounted on each supporting clamp 10. Each bearing sleeve 17 has a cylindrical portion 18 provided with a smooth external surface and adapted to be fitted and received in the cylindrical clamping member 11 of its supporting clamp. The split cylindrical clamping member 11 is forced into firm clamping engagement with the portions 18 of the bearing sleeves by means of nuts 19 engaged with the ears 13 and 14 and threaded on a rod 20 which extends across the front of the car between the two supporting clamps 10 and which has its ends extended through the apertures of the ears 13 and 14 of the two supporting clamps. In this way the same means which is employed for the purpose of bracing the supporting clamps also serves to adjust or secure the clamps in proper engagement with their supporting sleeves.

Just above the portion 18 of each sleeve a hexagonal shoulder 21 is integrally formed with the bearing sleeve and this hexagonal shoulder is engageable with the upper end of this clamp. Each bearing sleeve has a reduced and externally threaded extension 22 extending below its clamp 10 and the internally threaded upper end 23 of a cap 24 coacts with this externally threaded extension 22 and engages the lower end of the clamp 10 to force the shoulder 21 as well as its end 25 into binding engagement with the ends of the split clamping member 10, whereby a double clamping action for the purpose of holding each bearing sleeve in position is had.

Each lamp has a depending post 26 fixed thereto and fitted for rotative and sliding movement in its bearing sleeve. The lower end of the post 26 projects from below the sleeve and almost to the bottom of the cap 24, which cap is elongated and cylindrical. Interengaging means is provided between each post 26 and a reduced extension 28 at the upper end of each bearing sleeve for the purpose of limiting downward movement of each post 26 in its sleeve 18 and for the purpose of holding the lamps straight ahead and for securing them in adjusted position while permitting movement of the lamps at the proper time. This interengaging means includes a forwardly extending lateral projection 29 suitably fixed to each post. When a vehicle is running straight ahead on a substantially straight road this projection 29 has its pointed underside 29$^a$ received in a notch 30 formed in each reduced extension 28 at its front end between the lower ends of inclined portions 31. The projection 29 is held in such position by virtue of the action of a coil spring 32 having its upper end engaged with the lower end of the reduced extension 22 and having its lower end engaged with a washer 33 held in adjusted position on the lower end of the post 26 by means of a nut 34. This feature of having a portion of the pin or lateral projection 29 received in the notch 30 and positively engaged therewith prevents shaking, noise and vibration even after the parts have become worn.

While the headlights are positively held against movement when the car is running straight ahead on a substantially straight road, they may be readily turned at the proper time and when the headlights are turned the projections 29 ride up either of the inclined surfaces 31, depending upon which way the lamps are turned. Between the inclined surfaces 31 at the back of the bearing sleeve a flat horizontal surface 35 is provided and this enables the headlights to be used as trouble lights since the headlights may be raised upwardly against the action of the springs 32 and then turned to bring the projections or pins 29 to overlie the flat surfaces 35 so that when the headlights are released the springs 32 will hold the projections 29 engaged with the flat surfaces 35.

Each headlight or lamp has a rearwardly projecting lug 38 fixed thereto and the lugs have vertically disposed and internally threaded openings 39 with which screws or externally threaded bolts 40 are engaged. The bolts 40 have heads 41 provided with wings 41$^a$ whereby they may be conveniently turned. Lock nuts 42 are provided on the bolts and are engageable with the lugs 38 to hold the bolts in adjusted position. The bolts 40 co-act with attaching members 43 having vertically disposed internally threaded openings 44 which open at their lower ends into transverse openings 45. The openings 45 of the attaching members are smooth and are designed to slidably receive the ends of an operating bar 46. The bolts 40 may be engaged with the operating bar 46 to secure the same to the attaching members or these bolts may be elevated or moved out of engagement with the operating bar. If desired the operating bar may have openings 47 designed to receive the points or reduced extensions 48 on the bolts 40 for positively connecting these parts together when such connection is desired. At each end of the operating bar 46 a head 49, is provided, each head 49 having a threaded shank 50 which is engaged with internal threads in the ends of the bars 46. With this arrangement when the bolts 40 are moved to be out of engagement with the bar 46 a one-way driving connection is provided between the bar 46 and each of the lamps. In other words, when the bolts 40 are disengaged from the bar 46 and a right hand turn is made the bar 46 moves to the left, and the head 49 at the left of the bar 46 as viewed in Figure 7 engages the attaching member 50 of the headlight 2 to swing the headlight 2 in a clockwise direction, as viewed in Fig. 7, thereby causing the headlight 2 to follow the road and play upon the same while rounding the curve. The left headlight 3 remains facing straight ahead since the bar 46 slides through the openings 45 of the attaching member 50 of the left headlight 3. Obviously, when a left hand turn is made, the left headlight 3 turns and the right headlight 2 remains stationary.

Means is provided for shifting the operating bar 46 to the left or right when the steering gear is operated to turn the vehicle to the right or left. This means includes a double throw differential cam, designated generally at 55, and releasably secured to the steering collar 56 of the vehicle. The cam 55 includes a section 57 and a section 58, these sections being fitted around the steering column and being secured in position thereon by clamps 59, the clamps 59 co-acting with smooth ends 60 formed on the sections 57 and 58. A collar 61 is fixed to the steering column and prevents the sections 57 and 58 from sliding down the steering column even when the clamps 59 are loosened. The section 57 has a cam 62 and the section 58 has a similar cam 63 of larger throw. A flexible element, designated generally at 64, is provided and is shown as comprising a chain which is clamped on the steering column by the section 57, the section 57 having an internal groove 66 in which the chain 65 is received. Openings 67 are also formed in the sections 57 and out through these openings the runs 68 and 69 of the chain extend. The runs 68 and 69 are oppositely wound about the cams 55 and after being trained around pulleys or guide sheaves 70 and extended through guide conduits having offset guide rollers, these runs are connected to an eye 71 fastened to the rod 46 between the ends thereof. Of course, such guide conduits as may be desirable are employed. In each of the runs 60 and 70 a combination tensioning device and adjuster 72 is provided. The combination tensioning device and adjuster 72 consists of an open rectangular frame 73 having a threaded bearing 74 at one end in which a rod 75 is engaged, the threaded rod being fastened to a link of the chain. In the other end of the rectangular frame 73 a smooth opening or bearing is provided and slidably receives a smooth rod 76 having one end connected, as at 77, to a link of the chain and having a nut 78 on its outer end. A coil spring 79 encircles the smooth rod 76 and has one end abutting the frame 73 and the other end abutting the nut 78. When the spring 79 is compressed the effective length of the chain or run of the chain having the combined tensioning device and adjuster, is lengthened. In this way the flexible element is made extensible and it is not necessary to provide slack in the chain. Of course, all of the purposes of the slack ordinarily provided are accomplished but the undesirable features of the ordinary slack are avoided. Such adjustment as may be necessary to take up wear or as may be necessary for other reasons is had by turning the threaded rod 75 in its bearing 74.

With the arrangement shown when the steering wheel is turned the column 56 also turns and the cams 62 and 63 turn with the steering column. The provision of the cam 62 causes the section being wound to be taken up very quickly and insures a quick action of the headlights. The section or run that is being unwound unwinds more quickly than the section that is being wound, the larger throw of the cam 63 insuring this action, which action is necessary in view of the fact that the operating bar 46 moves forwardly to some extent when shifting to the right and left. The ordinary steering movements necessarily made when the car is running along a substantially straight road are not effective to turn the headlights for the reason that such steering movements do no more than compress the small spring 79. The spring 79 being more lightly tensioned than the springs 32 are first compressed and it is not until after these springs have been compressed that the pull exerted by the chain or run of the chain being wound is sufficient to overcome the action of the spring 32 to turn the headlights or headlight, as the case may be.

From the foregoing it will be understood that when the headlights are turned the posts 26 not only turn but also move up and down to some extent since the projections 29 of the posts ride up and down the inclined surfaces 31. This up and down movement of the posts is used for the purpose of forcing a circulation of lubricant or oil through the engaging parts or operating parts of the lamp mountings. For this purpose a piston assembly is mounted on the rod and co-acts with the cap 24 to provide an oil pump. In the arrangement shown the washer 33 and nut 34 are made to constitute the piston assembly as well as an abutment for the lower end of the coil spring 32, the washer 33 being of such a size as to exert an effective upward lift on the oil in the cap 24 and the post 26 moves upwardly. Either the post 26 or bearing sleeve 18 are formed with one or more oil grooves, one such oil groove being designated at 80 in Fig. 8. In this way the oil is forced up through the interstice between the post and its bearing sleeve and also up over the lower end of the bearing sleeve so as to lubricate the projection 29, the notch 30, the inclined surfaces 31 and the flat surface 35. A sleeve 81 is threadedly connected to the portion of the bearing sleeve which projects above the shoulder 21 and this sleeve defines an oil trap 82 which receives the excess oil sometimes delivered up above the bearing sleeve when the car has been used. A cap 83 is carried by the post 26 and extends around the sleeve 81. The oil accumulating in the trap 31 automatically seeps back into the chamber provided by the cap when the car remains still for any length of time. Of course, a suitable supply of lubricant is placed within the cap 24 before the same is put into position.

If either light burns out, merely connecting the other lamp to the operating bar causes the lamp that is burning to follow both right and left curves, whereby avoiding the necessity of replacing the defective globe until some more convenient time.

I claim:

1. In a dirigible headlight, a pair of lamps, a pivotal mounting for each lamp, an operating bar for the lamps, each lamp having a lug fixed thereto and provided with a threaded opening, a threaded bolt engaged with the threaded opening of each lug, an attaching member threadedly engaged with each bolt and having an opening, the operating bar being slidably fitted in the openings of the members, the bolts being engageable and disengageable with the operating bar, and heads connected with the ends of the bar and engageable with the members, one head being engaged with its member to move said member and the headlight associated therewith when the bar is moved in one direction and the other head being engaged with its member to move such member and the headlight associated therewith in an opposite direction when the bar is moved in an opposite direction.

2. In a dirigible headlight, a pair of lamps, a pivotal mounting for each lamp, an operating bar for the lamps, each lamp having a lug fixed thereto and provided with a threaded opening, a threaded bolt engaged with the threaded opening of each lug, a member threadedly engaged with each bolt and having an opening, the operating bar being slidably fitted in the openings of the members, the bolts being engageable and disengageable with the operating bar, means for holding the bolts in either adjustment, and heads connected with the ends of the bar and engageable with the members, one head being engaged with its member to move said member and the headlight associated therewith in one direction when the bar is moved in one direction and the other head being engageable with the other member to move said other member in an opposite direction when the bar is moved in an opposite direction.

3. In a dirigible headlight, a support having a bearing sleeve provided at its upper end with downwardly inclined portions at the front and with a notch in between the lower ends of said portions, a lamp having a post fitted in the bearing and having a lateral projection which is slightly larger in diameter than the notch is wide, said projection being engageable with the edges of the notch but being spaced from the bottom of the notch when the lug is moved down as far as it may be on the bearing sleeve, and yieldable means for urging the post downwardly in the bearing.

4. In a dirigible headlight, a support having a bearing, a lamp having a post rotatably and slidably fitted in the bearing, interengaging means between the post and the support for movably holding the lamp facing straight ahead, said interengaging means being releasable upon upward and turning movements of the lamp, yieldable means for holding the post and lamp in lowermost position, the post projecting down below the bearing, a cap carried by the bearing and enclosing the projecting portion of the post, a cap providing an oil chamber, and means carried by the post and cooperable with the chamber to effect circulation of the oil when the post moves up and down.

5. In a dirigible headlight, a bracket, a supporting clamp mounted on the bracket, a bearing sleeve carried by the supporting clamp, a headlight having a post rotatably fitted in the bearing sleeve, the bearing sleeve having a portion of its periphery engaged by the supporting clamp, the bearing sleeve having a shoulder engaged with the upper end of the supporting clamp, and means cooperable with the bearing sleeve and engageable with the lower end of the supporting clamp for further clamping the bearing sleeve to the supporting clamp.

6. Means for supporting a pair of dirigible headlights comprising a bracket for each headlight, each bracket having a forwardly extending horizontal portion provided with an internally threaded socket at its forward end, a headlight support for each headlight having an internally threaded stud engaged with the socket of the associated bracket, and means for holding the studs in any adjustment and including a rod extending between and positively fastened to the headlight supporting members.

7. In a dirigible headlight, a bearing, a lamp having a post fitted in the bearing for rotative and sliding movement, yieldable means for holding the post against movement and including a spring encircling the post, a nut and washer assembly engaged with the post and providing an abutment for the spring and an oil piston, and a cap carried by the bearing and enclosing the spring and nut and washer assembly and providing an oil chamber in which the piston constituted by the nut and washer assembly operates to effect circulation of the oil when the post moves up and down.

8. In a dirigible headlight, a pair of lamps, a pivotal mounting for each lamp, yieldable means for holding the lamps in position to face straight ahead, an operating bar for the lamps, means for connecting the operating bar with the lamps, and operating means for actuating the operating bar from the steering column of an automobile and including a pair of cams driven from the steering column, a chain having runs wound on the cams and connected with the operating bar, one of the cams being of a larger throw than the other, the cam of the larger throw controlling the unwinding operation to permit the runs of the chain to unwind faster than they are wound.

9. In a dirigible headlight, a pair of lamps, a pivotal mounting for each lamp, yieldable means for holding the lamps in position to face straight ahead, an operating bar for the lamps, means for connecting the operating bar with the lamps, and operating means for actuating the operating bar from the steering column of an automobile and including a pair of cams, means for releasably securing the cams to the steering column, a chain having runs wound on the cams and connected with the operating bar, one of the cams being of a larger throw than the other, the cam of the larger throw controlling the unwinding operation to permit the runs of the chain to unwind faster than they are wound.

10. In a dirigible headlight, a pair of lamps, a pivotal mounting for each lamp, yieldable means for holding the lamps in position to face straight ahead, an operating bar for the lamps, means for connecting the operating bar with the lamps, and operating means for actuating the operating bar from the steering column of an automobile and including a pair of cams, releasable means for securing the cams to the steering column, one of the cams having an internal groove and openings communicating with the groove, a chain received in the groove and having runs wound on the cams and connected with the operating bar, one of the cams being of a larger throw than the other, the cam of the larger throw controlling the unwinding operation to permit the runs of the chain to unwind faster than they are wound.

11. In a dirigible headlight, a pair of lamps, a pivotal mounting for each lamp, yieldable means for holding the lamps in position to face straight ahead, an operating bar for the lamps, means for connecting the operating bar to the lamps, means for actuating the operating bar from the steering gear of the automobile and including a chain having runs connected with the operating bar, and means connected with the steering gear and adapted to wind the chain as the steering gear operates, and means connected with the steering gear and adapted to unwind the chain faster than it is wound.

12. The combination with a pair of headlights having rearwardly projecting ears, of attaching members arranged beneath said ears and having bolts passing upwardly through said ears to connect the attaching members to said ears, the lower portions of said attaching members being provided with transverse openings into which the lower portions of said bolts extend, a rod extending through said transverse openings and having recesses receiving the lower portions of said bolts whereby the bolts constitute fasteners to secure the rod to said attaching members, and an operating cable secured to said rod.

13. The combination with a pair of headlights having rearwardly projecting ears, of attaching members arranged beneath said ears and having bolts passing upwardly through said ears to connect the attaching members to said ears, the lower portions of said attaching members being provided with transverse openings into which the lower portions of said bolts extend, a rod extending through said transverse openings and having recesses receiving the lower portions of said bolts whereby the bolts constitute fasteners to secure the rod to said attaching members, an operating cable secured to said rod, said headlights being provided with depending posts, bearings receiving said posts, and spring means urging said headlights to a predetermined position and being associated with said posts.

THOMAS C. HOLLIDAY.